E. O. SCHNEIDER.
CYLINDRICAL POSITIVE ELECTRODE.
APPLICATION FILED SEPT. 1, 1908.

924,503.  Patented June 8, 1909.

Witnesses:
Otto W. Holmgren.
F. George Barry.

Inventor:-
Ernst Otto Schneider
by attorneys

UNITED STATES PATENT OFFICE.

ERNST OTTO SCHNEIDER, OF DRESDEN, GERMANY.

CYLINDRICAL POSITIVE ELECTRODE.

No. 924,503.   Specification of Letters Patent.   Patented June 8, 1909.

Application filed September 1, 1908. Serial No. 451,257.

*To all whom it may concern:*

Be it known that I, ERNST OTTO SCHNEIDER, a subject of the King of Saxony, and resident of Groebelstrasse 15, Dresden, Kingdom of Saxony, German Empire, have invented a new and useful Improvement in Cylindrical Positive Electrodes, of which the following is a specification.

The invention relates to a cylindrical positive electrode and particularly to an electrode which is characterized by consisting of a number of rings being connected by longitudinal bars and being arranged in appropriate distances above each other. These rings may either be flat or have a concave or mold like shape.

The hollow body built up as above stated and forming the trestle or support for the active material is cast in one piece thus rendering its manufacture simple and very cheap. A principal advantage of the new electrode consists in the fact that the same has, although very light in weight, a greatly increased capacity in comparison with all known electrodes.

The structure further provides for greatly increasing the capacity in that it provides an interior hollow cylinder free from obstruction in which, if desired, a cylindrical negative electrode may be placed, and it is obvious that a second negative electrode might be placed around the outside of the electrode if so desired, while substantially the entire inner and outer faces of the active material are exposed to the electrolyte.

Furthermore the electrode according to the invention shows a great resistance and durability and its parts will not be liable to warp or bend nor will the filling mass be apt to fall out which would effect a fatal short circuit. The electrode is particularly suitable for batteries used in connection with small electric-light plants.

On the accompanying drawing the electrode according to the invention is shown by way of example.

Figure 1:
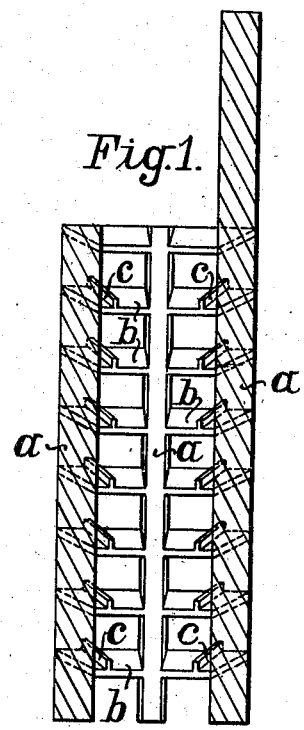
Figure 2:
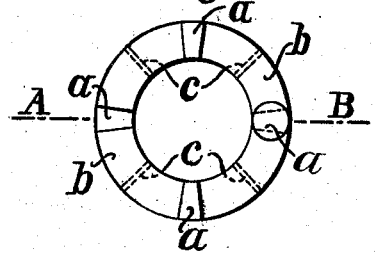

Figure 1 is a vertical section according to line A B in Fig. 2, and Fig. 2 is a plan view of the electrode.

The rings $b$, having in the construction shown, a concave or mold-like shape, are held at an appropriate distance one above another and in a vertical position by the longitudinal bars $a$, four of which, by way of example, are shown in the drawing and one of which is extended to form the exit pole for the current.

The rings $b$ are provided with the small ribs $c$ which effect the holding of the filling mass inserted or pressed between the rings and prevent the same from falling out.

The number of longitudinal bars $a$, of rings $b$ and of ribs $c$ on the latter may naturally be varied at liberty.

What I claim is:

1. A cylindrical positive electrode for use in secondary batteries comprising rings arranged at suitable distances above one another, radial vertical webs connecting the rings and terminating at their inner edges flush with the inner edges of the rings, forming between the webs and adjacent rings cells for the active material, leaving an interior hollow cylinder free from obstruction for the insertion of a cylindrical negative electrode and at the same time exposing substantially the entire inner and outer faces of the active material to the electrolyte while maintaining the rings and the active material securely in position.

2. A cylindrical positive electrode for use in secondary batteries comprising rings arranged at suitable distances apart one above another, vertical radial webs connecting the rings at intervals and forming together with the rings cells for the reception of the active material, one of the walls of each cell being provided with a radial rib for securing the active material in position in the cell, the said webs terminating flush with the inner circular walls of the rings, whereby a central cylindrical opening is obtained for the reception of a negative electrode while the inner and outer faces of the active material are exposed throughout substantially their entire extent to the action of the electrolyte.

3. A cylindrical positive electrode for use in secondary batteries comprising dish or mold shaped rings arranged at suitable distances apart from each other, vertical radial webs connecting the dish or mold shaped rings at intervals and forming together with such rings inwardly tapered segmental cells or compartments for the reception of the active material, the said webs terminating flush with the inner circular walls of the dish or mold shaped rings, whereby a cylindrical opening is obtained for the reception of a negative electrode, while the inner and outer faces of the active material are exposed throughout substantially their entire extent to the action of the electrolyte.

In testimony, that I claim the foregoing as my invention, I have signed my name in presence of two witnesses, this twentieth day of August, 1908.

ERNST OTTO SCHNEIDER.

Witnesses:
PAUL ARRAS,
CLÄRE SIMON.